UNITED STATES PATENT OFFICE.

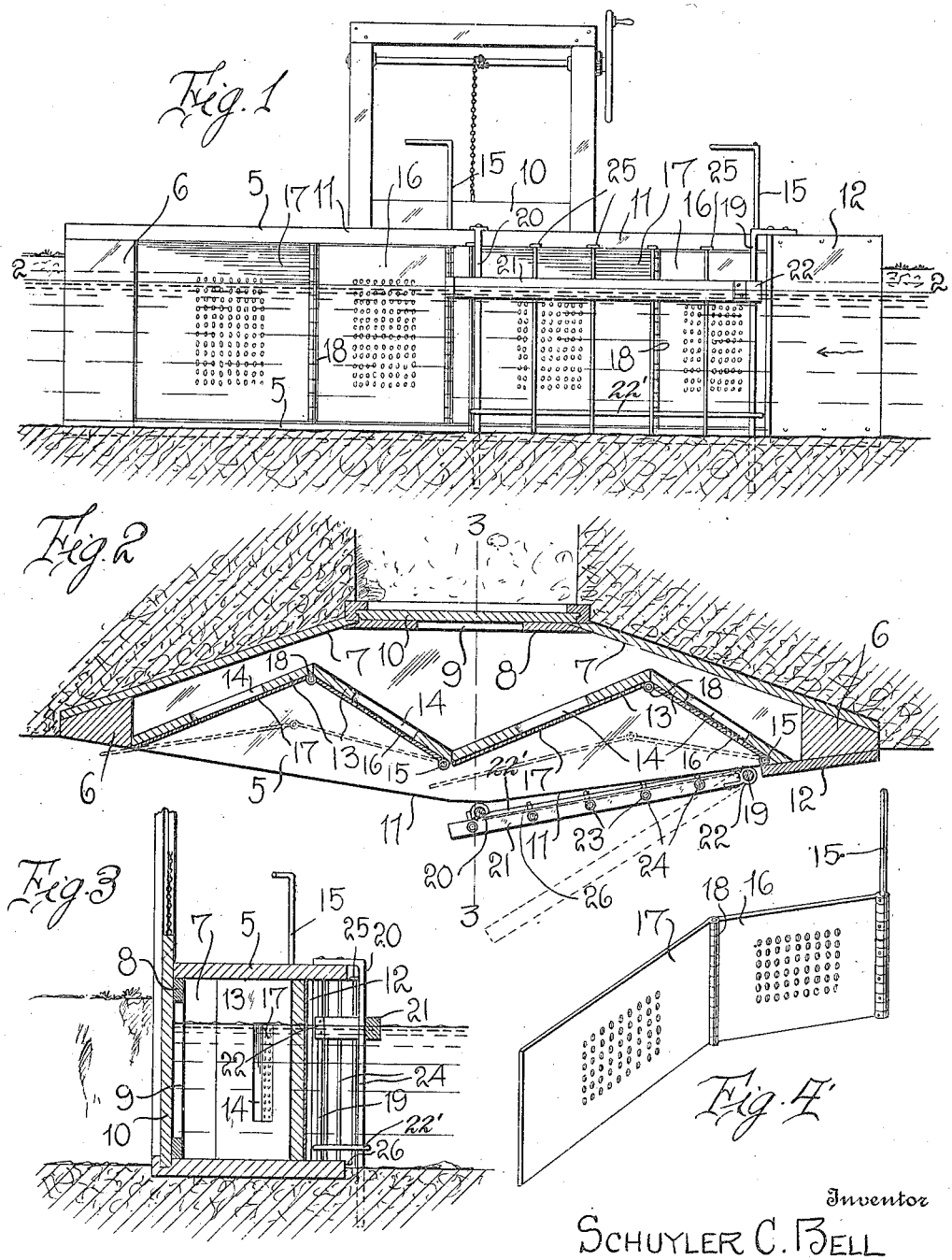

SCHUYLER C. BELL, OF SANTA FE, NEW MEXICO, ASSIGNOR OF ONE-HALF TO STELLA CHAMBERLAIN BELL, OF BELEN, NEW MEXICO.

FISH-SCREEN FOR IRRIGATING-DITCHES.

1,269,779.     Specification of Letters Patent.     Patented June 18, 1918.

Application filed June 30, 1917. Serial No. 177,919.

*To all whom it may concern:*

Be it known that I, SCHUYLER C. BELL, a citizen of the United States, residing at Santa Fe, in the county of Santa Fe and State of New Mexico, have invented certain new and useful Improvements in Fish-Screens for Irrigating-Ditches, of which the following is a specification, reference being had to the accompanying drawings.

This invention relates to an improved fish screen for irrigating ditches and has for its primary object to provide a very simple and effective device for preventing fish from entering the lateral ditch from the main irrigating ditch.

It is another object of my invention to provide a device for the above purpose which is so constructed that the same may be very readily cleaned and sediment collecting upon the screen plates removed therefrom.

It is another important object of the invention to provide simple and reliable means which will effectively prevent branches or other relatively heavy debris from lodging against the screen plates and obstructing the passage of water therethrough.

It is a further general object of my invention to provide a fish screen for irrigating ditches which may be inexpensively constructed and easily set up in operative position, is not liable to get out of order, and will effectively accomplish the desired purpose.

With the above and other objects in view, my invention consists in the novel features of construction, combination and arrangement of parts to be hereinafter more fully described, claimed and illustrated in the accompanying drawing, in which, Figure 1 is a front elevation of my improved fish screen, illustrating the preferred embodiment thereof;

Fig. 2 is a horizontal section taken on the line 2—2 of Fig. 1;

Fig. 3 is a transverse section taken on the line 3—3 of Fig. 2; and

Fig. 4 is a detail perspective view of one pair of screen plates.

Referring in detail to the drawing, 5 designates the top and bottom walls of a housing or casing between which the screen plates are mounted, said walls being connected and spaced apart at their ends by the blocks 6. The top and bottom walls 5 are also connected by means of the vertically disposed, converging walls 7, said latter walls being connected in spaced relation to the rear edges of the walls 5 by a gate wall 8. This wall is provided with an opening indicated at 9, and upon the wall a slide gate 10 is suitably mounted so that all or a portion of the opening may be closed and the flow of water therethrough thus controlled.

As clearly shown in Fig. 2, the other longitudinal edges of the walls 5 opposite the gate wall 8, are obliquely inclined in relatively opposite directions from the center of said walls to their ends, as at 11, and upon said inclined edges, at one end of the walls 5, a plate 12 is secured. This end of the device is adapted to point up-stream when the same is arranged in operative position in the bank of the main irrigating ditch, the water flowing in the direction indicated by the arrow in Fig. 1. Between the walls 5 and on each side of their central portion, the rearwardly converging, vertical walls 13 are secured, the connected rear ends of said walls being disposed in spaced relation to the vertical walls 7. Each of the walls 13 is provided with a rectangular opening 14 through which the water may freely pass. The outer ends of the inner opposed walls 13 are disposed in spaced relation to the front longitudinal edges 11 of the walls 5.

In the spaced horizontal walls 5, vertically disposed, spaced rods 15 are rotatably mounted. To each of these rods, a foraminous screen plate 16 is securely fixed at one of its ends and a similar plate 17 is hinged, as at 18, to the free end of the plate 16. These plates, when in operative position, are disposed entirely between the walls 5 and lie against the outer faces of the walls 13 over the openings 14 therein. The upper ends of the rods 15 are provided with suitable handles so that they may be readily turned to swing the plates 16 and 17 outwardly or inwardly between the walls 5.

To the top wall 5 on one side of its center, spaced vertical rods 19 and 20 are securely fixed and extend downwardly over the open side of the screen and below the bottom wall 5, the lower ends of said rods being adapted to be securely embedded in the bed of the ditch or stream. A horizontally disposed float bar 21 has an eye 22 fixed in one of its ends loosely engaged upon the rod 19, the other end of said float bar extending downstream engaging against the outer side of the vertical rod 20. This latter rod serves to hold the float bar in spaced relation to the screen. The rods 19 and 20 are connected together adjacent their lower ends by a stationary rod 22'. The float 21 is provided with a plurality of spaced vertical openings 23 therein through each of which a vertical rod 24 loosely extends, the upper end of each of said rods having a suitable head 25 formed thereon. The lower ends of the rods 24 are angularly bent, as at 26, to rest upon the bed of the stream, said rods bearing against the outer side of the connecting rod 22' between the rods 19 and 20, and thus obviating the bending of the rods 24 by heavy logs or other debris striking the same. By the provision of the float bar 21, it will be manifest that the open side of the screen extending upstream from the center of the screen, is guarded so that drifting debris cannot enter the same and lodge against the screen plates. This float bar being disposed at a longitudinal inclination will direct such debris outwardly into the stream away from the bank so that it will not find lodgment in the down-stream end of the screen.

From the foregoing description, taken in connection with the accompanying drawing, it is believed that the construction, manner of operation and several advantages of my invention will be clearly and fully understood. The water may freely pass from the stream or main irrigating ditch into the lateral ditch through the foraminous screen plates and the opening 9 in the wall 8 when the head gate is open, while said plates will effectively prevent the entrance of fish to the lateral ditch. By providing the space between the head gate wall and the walls 13, access may be had to the rear faces of these walls and the space therebetween so that sediment collecting therein can be readily removed. If the perforations in the screen plates 16 and 17 should become clogged, said plates may be rapidly agitated several times by turning the rods 15 and such sediment thereby dislodged or washed from the screen plates. It will thus be seen that I have produced a very simply constructed device for the above purpose and one which can be very readily set up in operative position and kept thoroughly clean and free from debris or sediment with but little manual labor.

While I have herein shown and described the preferred construction and arrangement of the several elements, it is, of course, manifest that the device is susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:—

1. In a fish screen for irrigating ditches, a vertical wall having a plurality of angularly related sections, each section having an opening therein, an articulated screen, and means for adjusting said screen into position to overlie the openings in the wall sections or to a position in spaced relation to said wall sections.

2. In a fish screen for irrigating ditches, spaced horizontal walls and vertical walls connecting the same, each of the vertical walls having an opening, hingedly connected screen plates disposed between the horizontal walls and against said vertical walls over the openings therein, and manually operable means connected to one of the screen plates for moving the same relative to each other and with respect to said vertical walls.

3. In a fish screen for irrigating ditches, spaced horizontal walls, a head gate at one end of said walls and in spaced relation thereto, vertically disposed converging walls arranged in pairs between the horizontal walls, each of the vertical walls having an opening, a pair of screen plates for each pair of vertical walls, said plates being connected for relative movement and adapted to lie against the outer faces of said vertical walls over the openings therein, and manually operable means connected to one of said screen plates for moving the plates relative to each other and with respect to said vertical walls.

4. In a fish screen for irrigating ditches, a housing open upon one end and provided upon its opposite end with a head gate, screen plates mounted in the open side of the housing, vertically disposed rods fixed to the housing and adapted to be embedded at their lower ends in the bed of a stream, and a float bar connected to one of said rods for vertical movement relative thereto across the open side of the housing.

5. In a fish screen for irrigating ditches, a vertical wall having angularly related sections, each section being provided with an opening, screen plates connected to each other for relative angular movement, and means operatively connected to one of said plates to move the respective plates into contact with the vertical wall sections and over the openings therein or into spaced angular relation to said vertical wall sections.

6. In a fish screen for irrigating ditches, a housing open upon one end and provided with a head gate on its opposite end, screen plates arranged in said housing, spaced vertical rods fixed to the housing and adapted to be embedded at their lower ends in the bed of a stream, a float bar connected at one of its ends to one of said rods for vertical movement with respect thereto, the other of said rods spacing the float bar from the open side of the housing, said float bar being vertically movable with respect to the housing in front of the screen plates.

7. In a fish screen for irrigating ditches, a housing open upon one end and provided with a head gate on its opposite end, screen plates arranged in said housing, spaced vertical rods fixed to the housing and adapted to be embedded at their lower ends in the bed of a stream, a float bar connected at one of its ends to one of said rods for vertical movement with respect thereto, the other of said rods spacing the float bar from the open side of the housing, a rigid connection between the lower ends of said vertical rods, and a plurality of spaced rods extending loosely over the float bar and resting at their lower ends upon the bed of the stream and in contact with said connection between the vertical rods, said float bar being vertically movable with respect to the latter rods and the housing in front of the screen plates.

In testimony whereof I hereunto affix my signature in the presence of two witnesses.

SCHUYLER C. BELL.

Witnesses:
STELLA BELL,
CHARLES JONES.

Copies of this patent may be obtained for five cents each, by addressing the "Commissioner of Patents, Washington, D. C."